United States Patent [19]
Mostafa et al.

[11] Patent Number: 5,949,779
[45] Date of Patent: Sep. 7, 1999

[54] MULTIPROTOCOL ADAPTOR FOR COMMUNICATION BETWEEN CEBUS DEVICES AND REMOTE CONTROLLERS OVER AN ATM-BASED BROADBAND ACCESS NETWORK

[75] Inventors: Mohamed Mostafa, Menlo Park; Rajesh Kumar, Fremont, both of Calif.

[73] Assignee: Ericsson, Inc., Menlo Park, Calif.

[21] Appl. No.: 08/853,109

[22] Filed: May 8, 1997

[51] Int. Cl.$^6$ .................................................. H04L 12/40
[52] U.S. Cl. ............................................ 370/389; 370/465
[58] Field of Search ................................... 370/401, 402, 370/403, 410, 466, 465, 389

[56] References Cited

U.S. PATENT DOCUMENTS

| 5,636,211 | 6/1997 | Newlin et al. | 370/465 |
| 5,809,076 | 9/1998 | Hofmann | 370/401 |
| 5,848,054 | 12/1998 | Mosebrook et al. | 370/226 |

FOREIGN PATENT DOCUMENTS

WO 97 09800  3/1997  WIPO .

OTHER PUBLICATIONS

Manikopoulos C N et al: "Performance Analysis of a Gateway Connecting the Cebus to the ISDN" IEEE Transactions on Consumer Electronics, vol. 39, No. 4, Nov. 1, 1993, pp. 870–877, XP000423076 * section 2* see figures 1, 2.

Burton L et al: "The Residential Gateway" Annual Review of Communications, vol. 49, Jan. 1, 1996, pp. 457–467, XP00062083 see p. 462, col. 1, line 23–p. 463, col. 2, line 12.

Primary Examiner—Min Jung
Attorney, Agent, or Firm—Lyon & Lyon LLP

[57] ABSTRACT

A system for providing remote access and control of electronic devices connected to a CEBus network includes a remotely located master node, e.g., a utility server controller, which is linked to the CEBus network via an ATM-based broadband access network ("BAN"). A proxy node is provided on the CEBus network, wherein the proxy node is also linked to the master node via the BAN. The remotely located master node may thereby communicate with one or more devices located on the CEBus network by transmitting messages to the proxy node over the BAN. The proxy node converts the messages from an ATM protocol compatible with transmission over the BAN to a respective CEBus network protocol, and then forwards the messages to recipient device(s) over the CEBus network. In the opposite direction, a device on a CEBus network may communicate with the remotely located master node by transmitting CEBus-standard messages to the respective proxy node over the CEBus network. The proxy node packetizes the messages into an ATM transmission format and forwards the messages to the master node over the BAN. The system may be advantageously employed as an energy management system for providing remote control by a utility host master node of a plurality of utility-managed settable nodes located on a plurality of CEBus networks.

10 Claims, 9 Drawing Sheets

5,949,779

MULTIPROTOCOL ADAPTOR FOR COMMUNICATION BETWEEN CEBUS DEVICES AND REMOTE CONTROLLERS OVER AN ATM-BASED BROADBAND ACCESS NETWORK

RELATED APPLICATION DATA

This application is a related to co-pending U.S. application Ser. No. 08/843,461 filed Apr. 16, 1997, pending, and entitled "CEBus Data Link Layer Proxy," which is fully incorporated herein by reference.

FIELD OF THE INVENTION

The present invention pertains to the field of data communications and, more particularly, to methods and apparatus for controlling and statusing devices located on CEBus networks with a remotely located master node over a non-CEBus network.

BACKGROUND OF THE INVENTION

In recent years, electronic devices have been developed with the ability to transmit and receive control and status information to and from other electronic devices, including controller devices. For example, electric meters in residential homes may now be commanded by a controller device to transmit the electric usage status of the home to the controller device. In another example, a controller device may command an air conditioner in a home to switch off power in an attempt to balance the load in a residential subdivision.

CEBus ("Consumer Electronics Bus") is a standard developed by the Electronics Industry Association's ("EIA") Consumer Group for governing the communications between such electrical (i.e., "consumer") devices and controllers. This standard specifies how the devices and controllers send and receive information, and the media available to them for communication purposes. In particular, the CEBus standard permits devices made by different manufacturers to communicate with each other in a residential setting over a "CEBus network." The standard is documented in the CEBus EIA/IS-60 specification, which is fully incorporated herein by reference.

Thus far, CEBus networks have been geared for "local access" control and surveillance. In other words, a controlling device needs to be located on the same CEBus network as the controlled device. In particular, no systems or communication protocols exist for supporting the control of devices located on a CEBus network by a remotely located controller that accesses the CEBus network via a non-CEBus network, such as a telephone distribution network. Such "remote control" capability would be especially useful to provide efficient control of multiple devices located on multiple CEBus networks—e.g., located throughout a residential subdivision—via a single centralized controller.

It has been proposed that remote communication and control of CEBus networks be implemented using modem links over conventional copper wire pairs. However, field trials have shown this approach to be unreliable and costly, due to incompatible communication protocols between CEBus networks and non-CEBus networks.

Thus, it would be advantageous to provide a system for reliable and cost efficient remote access to, and control of, devices on a CEBus network via a non-CEBus network.

SUMMARY OF THE INVENTION

These advantages are obtained by the systems and methods provided in accordance with the present invention, which allow for a remotely located master node, e.g., a utility server controller, to access and control electronic devices connected to multiple CEBus networks via a non-CEBus network.

In one preferred embodiment, a remotely located master node is linked to a CEBus network via an ATM-based broadband access network ("BAN"). A proxy node is provided on the CEBus network, wherein the proxy node is also linked to the master node via the BAN. The remotely located master node may thereby communicate with one or more devices located on the CEBus network by transmitting messages to the proxy node over the BAN. In particular, the proxy node converts the messages from an ATM protocol compatible with transmission over the BAN to a respective CEBus network protocol, and then forwards the messages to recipient device(s) over the CEBus network. In the opposite direction, a device on a CEBus network may communicate with the remotely located master node by transmitting CEBus-standard messages to the respective proxy node over the CEBus network. The proxy node packetizes the messages into an ATM transmission format and forwards the messages to the master node over the BAN.

In accordance with a more particular aspect of the invention, in order to establish a communication link with a first plurality of CEBus networks, the remotely located master node executes a protocol for establishing a "house code" for a respective port linked to the BAN, (i.e., a BAN port), adhering to the CEBus standard protocol. In particular, a house code is used to address a group of CEBus devices at the same time. Upon establishing a house code for a respective BAN port, the remotely located master node can then issue the house code, along with a unique, individual unit address, to selected CEBus devices on a CEBus network linked to the respective BAN. In this manner, the remotely located master node can thereafter command and status the respective CEBus devices, via CEBus-standard messages, by using the house code.

Thus, a general object of the invention is to support communications between a remotely located master node on a non-CEBus network and one or more devices on a CEBus network.

Other and further objects, features, aspects and advantages of the present invention will become better understood with the following detailed description of the accompanying drawings.

BRIEF DESCRIPTION OF THE DRAWINGS

The drawings illustrate both the design and utility of preferred embodiments of the present invention, in which.

DETAILED DESCRIPTION OF THE DRAWINGS

Figure 1:
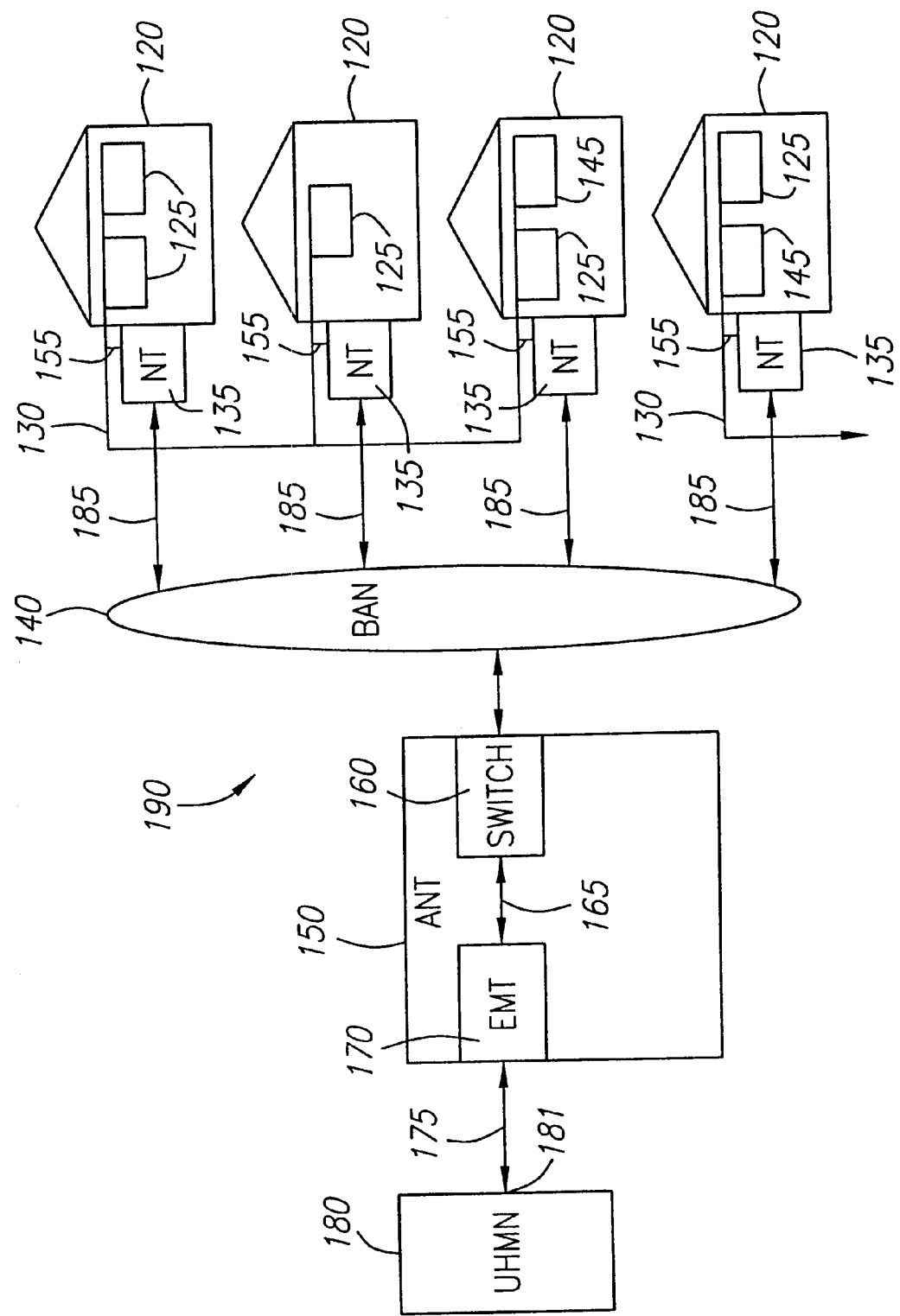
FIG. 1 is a diagram illustrating the mapping of a plurality of CEBus residential networks across a non-CEBus ATM-based broadband access network ("BAN"), including an energy management terminal ("EMT") located at an access network termination ("ANT") facility.

Referring to FIG. 1, a plurality of CEBus standard residential networks 130 each connect various respective devices located in one or more residences 120. In particular, a residence 120 may contain one or more utility-managed settable nodes ("UMSN"s) 125 managed by a utility company in energy-management applications, including, but not limited to, gas and electrical appliances. More particularly, a UMSN 125 is a "CEBus device" that communicates with other, similar CEBus devices via CEBus standard-defined messages and protocols. A plurality of UMSNs 125 that can communicate either directly across a shared physical medium, or indirectly via a plurality of physical media, collectively comprise the CEBus network 130.

Notably, a single CEBus network 130 may contain UMSNs 125 from a plurality of residential homes 120. The same CEBus network 130 may also contain other, non-UMSN CEBus devices 145. The respective CEBus devices 125 and non-CEBus devices 145 on a CEBus network 130 are all referred to as CEBus nodes.

Each CEBus network 130 has a physical layer consisting of the information signals transmitted within the respective CEBus network 130. Each CEBus network 130 also has a data link layer ("DLL"), which provides the means for establishing and maintaining individual data links on the respective CEBus network 130. In particular, the CEBus network 130 DLL provides for the transfer of information over a physical link, or links, connecting the respective UMSN devices 125 (and non-UMSN CEBus devices 145) to the respective CEBus nodes 125 and 145, including the requisite synchronization, error control and flow control.

Each residential home 120 is also provided with a network terminal ("NT") 135, which is connected to a respective CEBus network 130. From the perspective of the CEBus network 130, the NT 135 is another UMSN (125). In particular, the NT 135 serves as a network interface, or "access node" to an ATM-based distribution network 140 carrying two-way telecommunications and interactive digital baseband services. These services are provided by the NT 135 via a mix of service interfaces, which are connected to respective computing, telecommunications and entertainment equipment located in the residence 120.

An exemplary network interface that could be employed as an NT 135 is shown and described in U.S. patent application Ser. No. 08/608,436, filed Feb. 28, 1996, entitled, "Subscriber Network Interface And Method," which is fully incorporated herein by reference. The network interface disclosed and described therein supports the two-way transport of multiple communication services, including at least RF analog and RF carrier modulated ATM cells, over a single coaxial distribution cable. ATM cell-mux circuitry in the network interface provides for de-multiplexing and routing of incoming ATM cells, and for collecting and multiplexing of outgoing ATM cells respectively, wherein the incoming and outgoing ATM cells are routed to and from a plurality of "ATM" subscriber service modules within the network interface.

More particularly, the respective subscriber service modules each support individual services such as telecommunications, set-top telemetry, or baseband digital data services, e.g., ethernets or a dedicated PC modem data line. Each service module "disassembles" the respective incoming cells routed to it by the ATM cell-mux, converting (or "adapting") the data contained therein into an appropriate service protocol for delivery through a subscriber-side I/O port associated with the respective service module. The protocol conversion may include, for example, circuit emulation for providing a synchronous digital data stream, depending on the respective service. Conversely, information in upstream signals received through a subscriber-side I/O port is assembled into sequential cells by the respective service module and delivered to the ATM cell-mux. In this manner, the ATM transmission of combined services over the network side is advantageously transparent at the subscriber-side I/O ports of the network interface.

Although the referenced disclosure makes no specific reference to having a CEBus interface as one of the implemented subscriber service modules, or otherwise being a utility managed node, it will be apparent to those skilled in the art from both that disclosure and the present disclosure that the described network interface may be adapted for these purposes as well.

As will be apparent to those skilled in the art, the ATM-based distribution network 140 may take various physical forms. By way of example, "downstream" ATM traffic intended for one or more NTs 135 may initially be multiplexed for transport over a shared high speed optical fiber (not shown), then de-multiplexed for local distribution over a shared coaxial cable (also not shown). In alternate preferred embodiments, a pure optical or coaxial network may be equally employed.

By way of specific examples, a preferred system architecture and data transmission protocol for an ATM-based point-to-multipoint optical distribution network is disclosed and described in U.S. patent application Ser. No. 08/826, 633, filed Apr. 3, 1997, entitled "Data Transmission Over a Point-to-Multipoint Optical Network." Likewise, a preferred system architecture and data transmission protocol for an ATM-based point-to-multipoint distribution network employing a shared coaxial medium is disclosed and described in U.S. patent application Ser. No. 08/772,088, filed Dec. 19, 1996, entitled "Network Architecture for Broadband Data Communication Over a Shared Medium." Both of these applications are fully incorporated herein by reference.

Each NT 135 has a CEBus network interface 155 for the transmission and receipt of messages between the NT 135 and one or more UMSNs 125 and/or other CEBus devices 145 on the CEBus network 130. Each NT 135 also has a non-CEBus network interface 185 (e.g., a coaxial drop cable) for the transmission and receipt of data over the distribution network 140. In particular, each NT 135 transmits and receives data over the distribution network 140 to and from a packet switch 160, e.g., an ATM switch, located at an access network termination ("ANT") facility 150.

In a presently preferred embodiment, the packet switch 160 also communicates via a data link 165 with an energy management terminal ("EMT") 170 located at the ANT 150, which is configured to send and receive messages to and from a remotely located utility host master node ("UHMN") 180. In particular, a bidirectional point-to-point "virtual channel" is established for ATM cell transmission between each respective NT 135 and the EMT 170. The virtual channel may be a uniform bit rate ("UBR") ATM adaption layer five semi permanent virtual channel ("UBR AAL5 semi-PVC"), wherein the EMT 170 would operate as an AAL5 termination point. In this manner, the distribution network 140, and ANT 150 collectively comprise a broadband access network ("BAN") 190.

A communication interface 175 is provided between the EMT 170 and a selected port 181 of the UHMN 180, such as, e.g., a local area network ("LAN"), e.g., Ethernet 10BASE-T, a point-to-point digital link, etc. In any of these cases, the EMT 170 preferably communicates with the UHMN 180 via internet protocol ("IP") datagrams having CEBus standard packets, or messages, also called link protocol data units ("LPDU"s) encapsulated in the respective IP datagrams. In this manner, the respective port 181 provides a communication interface between the UHMN 180 and the BAN 190.

In a presently preferred embodiment, the UHMN 180 is a central management entity, responsible for monitoring and controlling UMSNs 125 located in several residences 120; i.e., via the plurality of CEBus networks 130. The UHMN 180 may be owned by a single utility such as an electric or gas company. In the alternative, the UHMN 180 may comprise a gateway computer owned by a communications service provider, e.g., a telephone company, which provides access to several utilities or surveillance companies.

Figure 2:
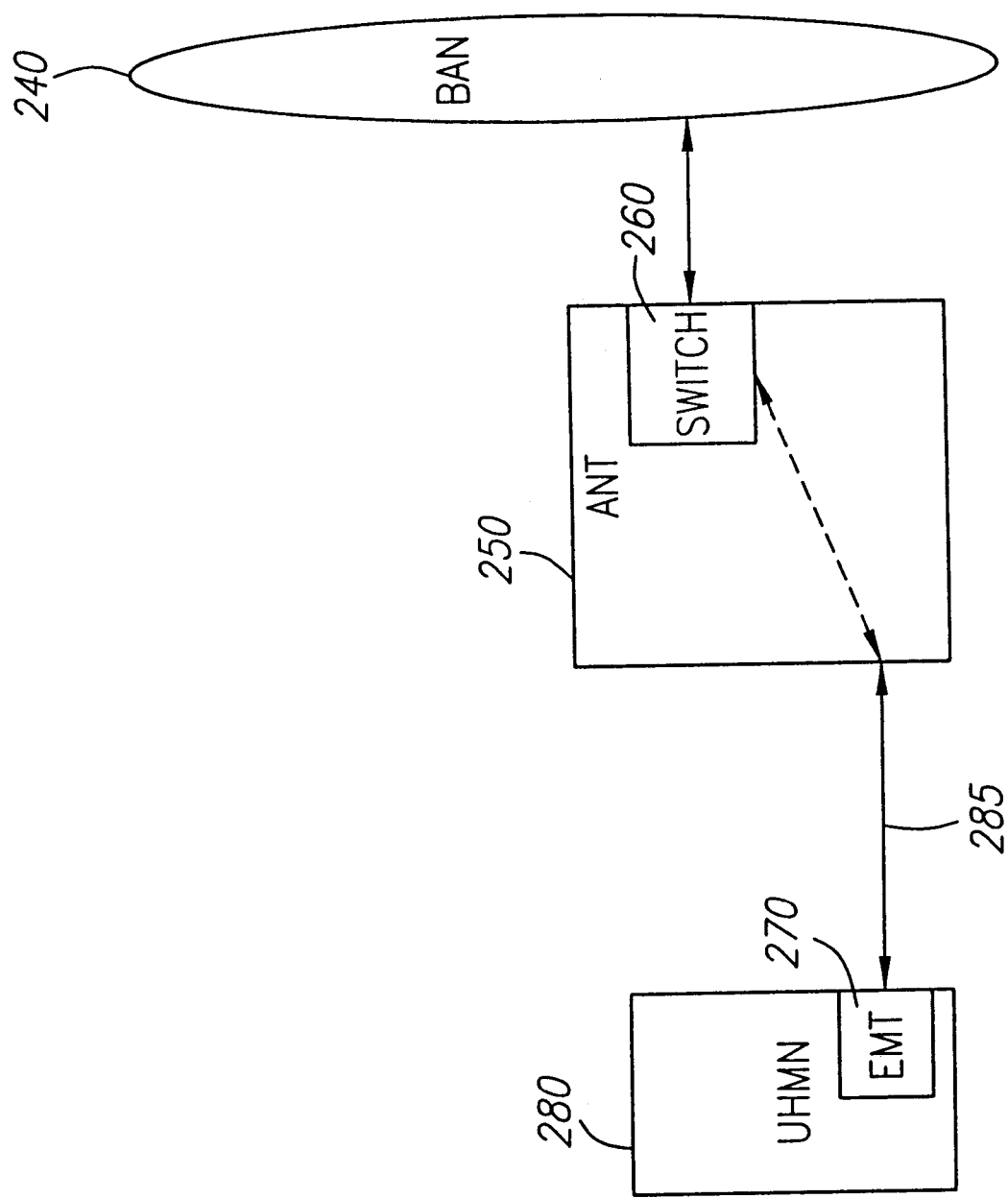
FIG. 2 is a diagram of an alternative system for mapping a id plurality of CEBus residential networks across a non-CEBus BAN, in which an EMT is located at a utility host management node

Referring to FIG. 2, in an alternative configuration, an EMT 270 may instead be located at a UHMN 280. In this configuration, a standard ATM interface 285 is provided between the EMT 270 and an ATM switch 260 located at an ANT 250. As with the ATM switch 160 of FIG. 1, the ATM switch 260 transmits and receives data to and from a plurality of NTs (not shown) via an ATM-based distribution network 240.

Regardless of whether an EMT is co-located with a UHMN, such as the EMT 270 in FIG. 2, or part of an ANT, such as the EMT 170 in FIG. 1, it provides provisional mapping of CEBus unit addresses, i.e., individual CEBus node addresses, into virtual path identifier/virtual channel identifier (VPI/VCI) combinations. In particular, the mapping of CEBus unit addresses into VPI/VCI combinations applies only to energy management messages (i.e., meter read or direct load control for turning the CEBus device's power on or off) and not to hailing LPDUs and hailing response LPDUs, which are replicated by the respective EMT 170 or 270 and transmitted to all of the respective downstream CEBus networks.

Figure 3:
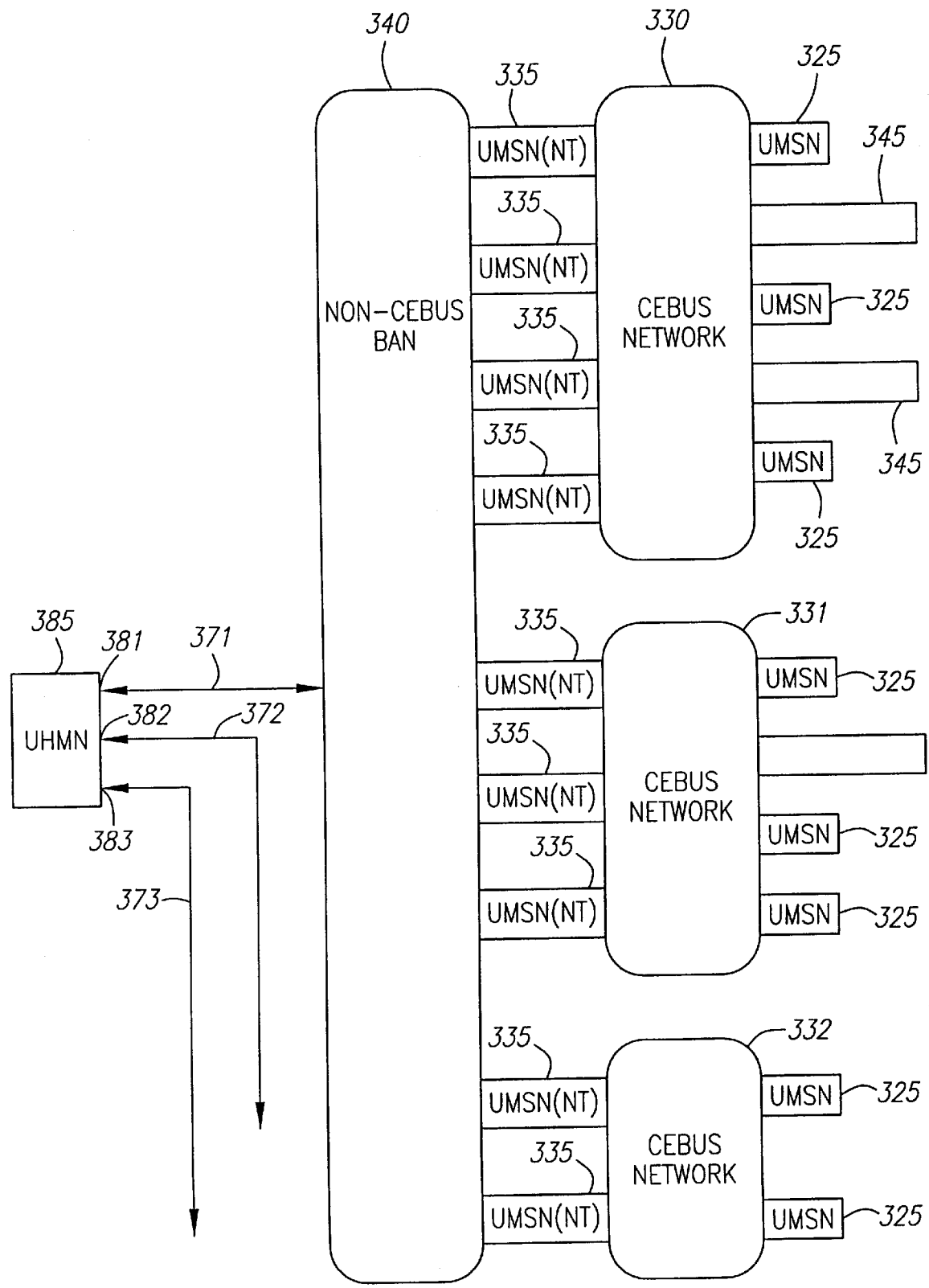
FIG. 3 is a diagram of the logical view of a communication path between an UHMN located on a BAN and a plurality of utility-managed settable nodes ("UMSN"s) located on respective CEBus networks, wherein the CEBus networks are linked to the BAN via respective network termination ("NT") devices.

Referring to FIG. 3, an exemplary UHMN 385 has a plurality of ports 381, 382 and 383 for connecting the UHMN 385 to a plurality of respective non-CEBus networks. In particular, a first UHMN port 381 links the UHMN 385 via interface 371 to a first non-CEBus network 340; a second UHMN port 382 links the UHMN 385 via interface 372 to a second non-CEBus network (not shown); and a third UHMN port 383 links the UHMN 385 via interface 373 to a third non-CEBus network (also not shown). A plurality of independent CEBus networks 330, 331 and 332 are each linked to the non-CEBus network 340 via one or more respective NTs 335, and are each comprised of one or more UMSNs 325. The CEBus networks 330, 331 or 332 may additionally include one or more non-UMSN CEBus devices 345. In a presently preferred embodiment, the exemplary non-CEBus network 340 is an ATM-based BAN.

Figure 4:
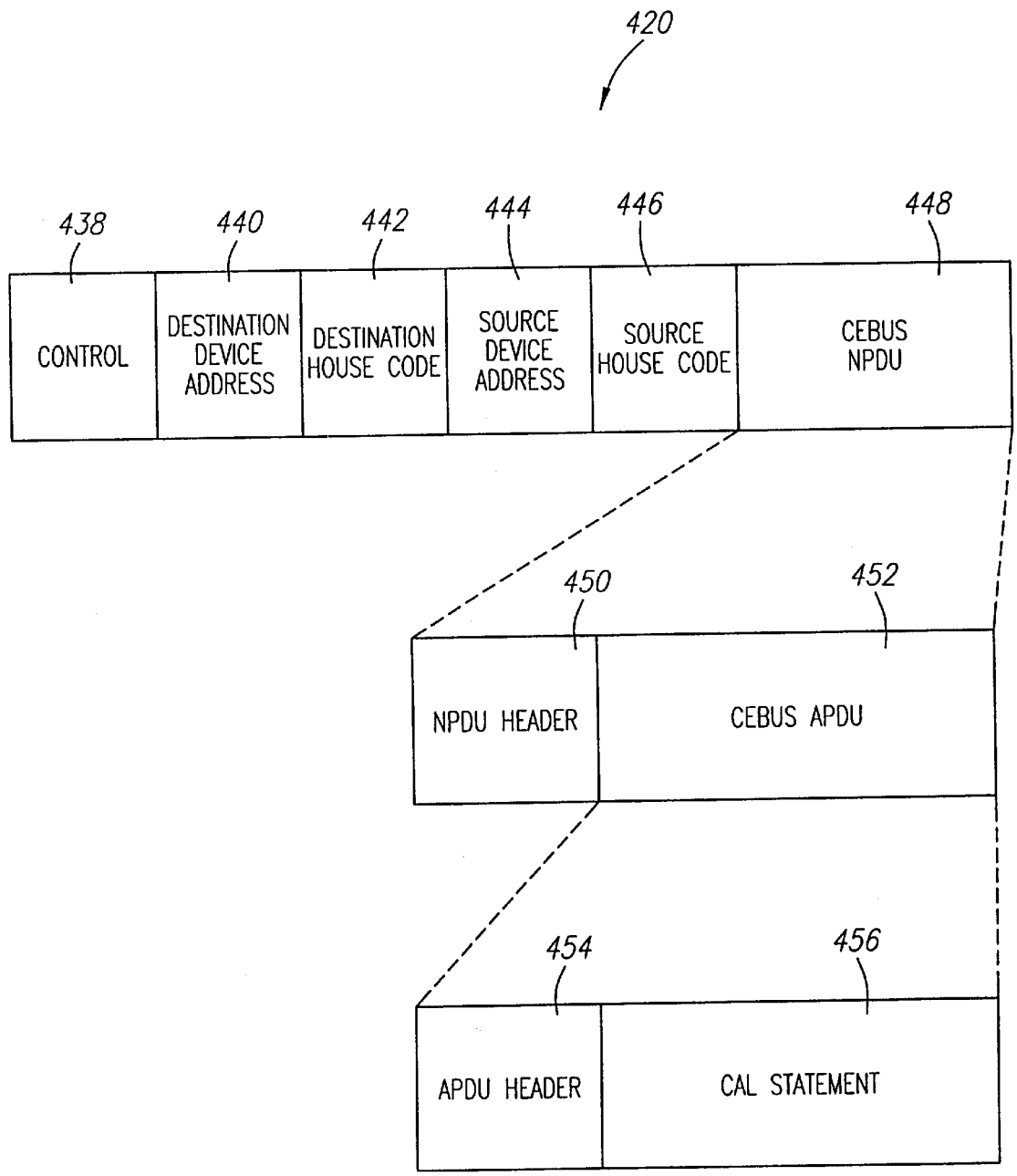
FIG. 4 is a diagram of a CEBus "link protocol data unit" ("LPDU")

In accordance with the EIA/IS-60 standard, respective UMSNs communicate via LPDUs. In particular, referring to FIG. 4, an LPDU 420 is a packet of information comprised of ten to forty-one bytes (also referred to as "octets"), which include a control byte 438, a destination device address field 440, a destination house code field 442, a source device address field 444, a source house code field 446 and a CEBus standard network packet data unit ("NPDU") field 448. The NPDU field 448, which consists of a maximum of thirty-two bytes, contains an NPDU header field 450 of at least one byte and a CEBus standard application packet data unit ("APDU") field 452 of up to a maximum of thirty-one bytes. The APDU field 452 may be null, in which case it contains zero bytes. If the APDU field 452 is non-null, it contains an APDU header field 454 of at least one byte and a CAL statement field 456 of up to a maximum of thirty bytes. CAL is the language by which the CEBus devices communicate, and is also used for controlling and statusing CEBus devices and allocating CEBus network resources, e.g., house codes and unit addresses (described in greater detail herein). A CAL statement 456 is the particular CEBus control or status information transmitted in a respective LPDU.

Referring briefly back to FIG. 1, when an NT 135 receives an LPDU destined for a UHMN 180 from an UMSN 125 on a respective CEBus network 130, or has generated its own LPDU intended for the UHMN 180, it must first conform the LPDU for upstream ATM transmission over the (non-CEBus) ATM-based BAN 190.

Figure 5:
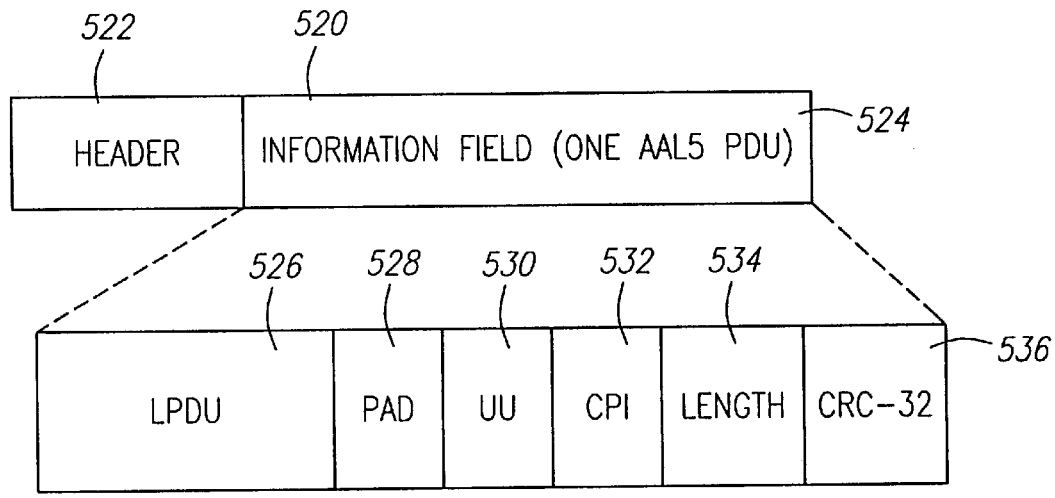
FIG. 5 is a diagram of a first preferred ATM encapsulation of a CEBus LPDU.

In particular, referring to FIG. 5, a preferred ATM cell 520 for transporting an LPDU 526 having forty bytes or less consists of a five-byte header field 522 and a forty-eight byte log ATM adaption layer five ("AAL5") protocol data unit ("PDU") information field 524. The AAL5 PDU information field 524 contains the LPDU 526, an AAL5 standard zero to thirty bytes of padding 528, a one-byte user-to-user ("UU") field 530, a one-byte common part indicator ("CPI") field 532, a two-byte length field 534, and a four-byte cyclic redundancy check ("CRC-32") field 536.

Figure 6:
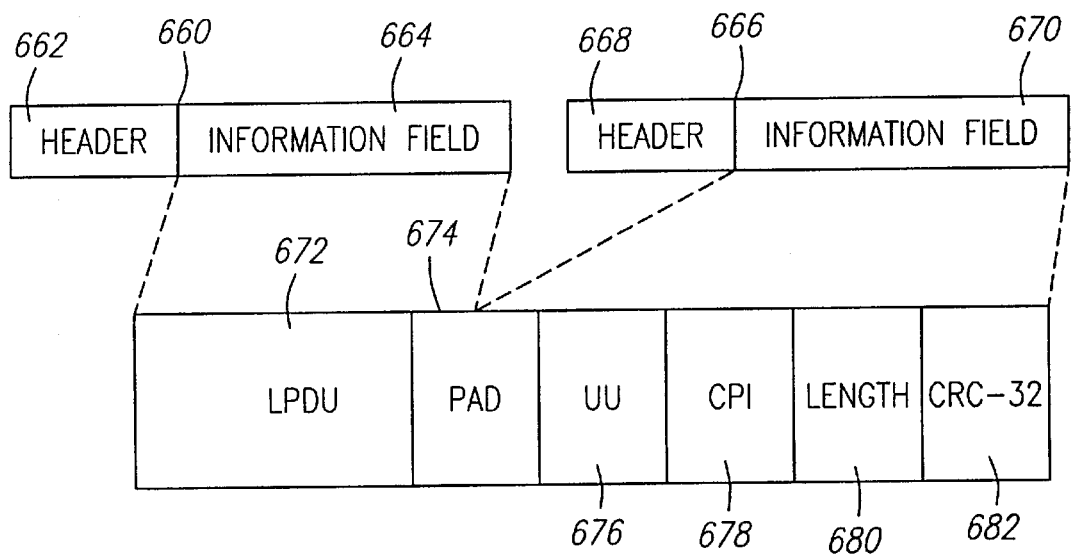
FIG. 6 is a diagram of a second preferred ATM encapsulation of a CEBus LPDU.

Referring to FIG. 6, where an LPDU 672 is forty-one bytes long (i.e., a maximum length LPDU) two sequential ATM cells 660 and 666 are employed—the first cell 660 to carry the LPDU, and the second cell 666 to carry the associated PDU information. In particular, the first ATM cell 660 consists of a five-byte header field 662 and a forty-eight byte information field 664. The information field 664 contains the forty-one byte LPDU 672 and seven bytes of a padding field 674. The second ATM cell 666 also consists of a five-byte header 668 and a forty-eight byte information field 670. The information field 670 contains forty bytes of the padding field 674, a one-byte UU field 676, a one-byte CPI field 678, a two-byte length field 680, and a four-byte CRC-32 field 682.

By way of illustration, in conjunction with FIG. 1, in the upstream direction, a respective NT 135 strips off a standard CEBus preamble and CRC data of a CEBus packet transmitted by a UMSN 125 and packages the (remaining) LPDU into one or two ATM cells, which it then forwards to the UHMN 180 over the BAN 190. In the downstream direction, the respective NT 135 extracts an LPDU transmitted from the UHMN 180 from a respective ATM cell encapsulating it, adds a CEBus standard preamble and CRC data to the extracted LPDU to form a respective CEBus packet, and forwards the CEBus packet to a respective UMSN 125.

The ATM termination point (e.g., EMT 170 of FIG. 1 or EMT 270 of FIG. 2) performs the converse of the respective NT's operations on messages transmitted between a UHMN and a UMSN (e.g., UHMN 180 and a respective UMSN 125 of FIG. 1). In particular, in the upstream direction, (i.e., from a UMSN to a UHMN), the ATM termination point extracts an LPDU encapsulated in an ATM cell by the respective NT, and then forwards the extracted LPDU to the UHMN. In the downstream direction, (i.e., from a UHMN to a UMSN), the ATM termination point packages the LPDU received from the UHMN into one or two ATM cells, which it then forwards to the respective NT.

As described above with reference to FIG. 4, the LPDU 420 includes the destination house code field 442 and a source house code field 446. In particular, several CEBus devices, including one or more NTs and a UHMN (e.g., UHMN 180, NTs 135 and UMSNs 125 of a respective CEBus network 130 of FIG. 1), which are interconnected through the same physical medium or through multiple physical media may comprise a group that is assigned a unique house code. A house code allows all the nodes of the respective group to be addressed by a single "broadcast" LPDU, i.e., an LPDU which has its respective destination house code field set to the group's house code and its respective destination device address field set to the CEBus standard broadcast value 0000 hex. If an LPDU is to be broadcast to all the CEBus nodes of all the groups to whom the LPDU originator has a link, the LPDU destination house code is set to the CEBus standard broadcast value of 0000 hex.

More particularly, a house code may be either a house system address or a house zone address. A house system address is used with a group of CEBus devices that span multiple physical media. The CEBus standard valid house system assignable addresses are 0100-01FF hex and 8001-EFFF hex. A house zone address, in contrast, can only be associated with a group of CEBus devices that reside on a single physical medium. Notably, in accordance with the EIA/IS-60 specification, valid house zone assignable addresses are limited to a range 0001-00FF hex or 0200-7FFF hex.

Whether a house system or house zone address, a unique house code inhibits CEBus nodes in one house system from accidentally communicating with CEBus nodes in another house system or house zone. Once a CEBus node acquires a house code, it is preferably stored in a non-volatile memory, so as to not be lost during a subsequent power interruption to the CEBus node.

As described above with reference to FIG. 4, the LPDU 420 also includes the destination device address field 440 and the source device address field 444. A device address, also referred to as a "MAC" address or "unit" address, is a unique address assigned to each CEBus node, including NTs and a UHMN, linked to a CEBus network (e.g., UHMN 180, NTs 135 and UMSNs 125 of a respective CEBus network 130 of FIG. 1).

In a presently preferred embodiment, a UHMN assigns itself a unit address of 0001 hex. All other CEBus nodes "hail" for their unique device address, or, alternatively, are assigned one by a "configuration master" of the respective CEBus network.

A configuration master is a master node, including a UHMN, that is in control of house code propagation to one or more CEBus devices, including UMSNs and NTs. Any master node can be a configuration master. For a CEBus network, only one master node can be configuration master at any given time, but different master nodes can be configuration master at different times.

Figure 7:
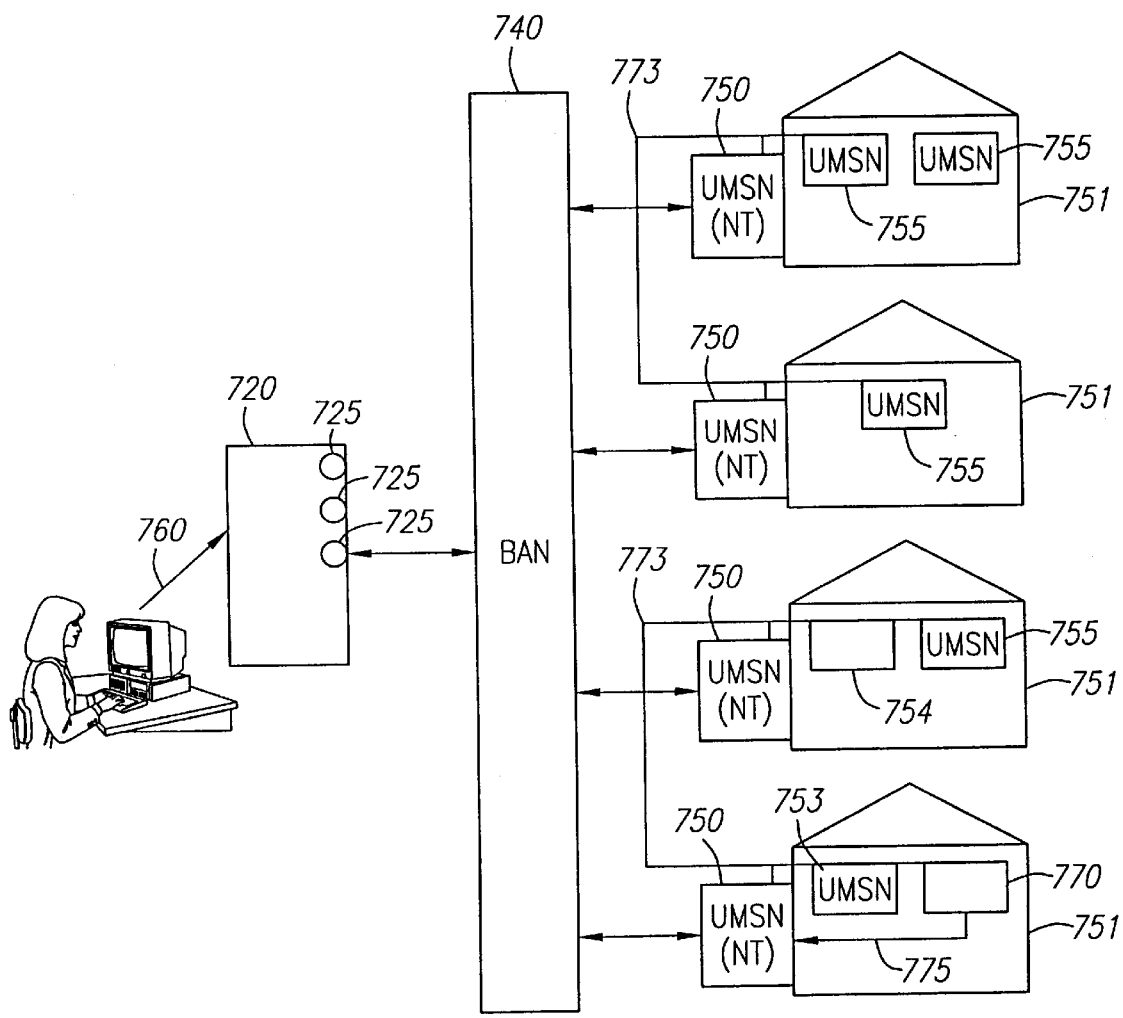
FIG. 7 is a diagram of a preferred UHMN protocol for obtaining a house code.

Referring to FIG. 7, an exemplary UHMN 720 acquires an unique house code for each of its active BAN ports 725. Hence, it is convenient to view the active BAN ports 725 of the UHMN 720 as "virtual" UHMN nodes, each virtual node connecting to a respective BAN 740. The same house code assigned to a BAN port 725 is then assigned to all UMSNs 755, including all NTs 750, located on a CEBus network 773 connected to that BAN port 725 via the respective BAN 740. This house code, however, is not assigned to non-UMSN CEBus nodes 754 connected to the same respective CEBus network(s) 773.

Notably, since a house code of the UHMN 720 may potentially span across several CEBus networks 773, the UHMN 720 uses a house system address in preference to a house zone address, since a house zone address can only be associated with a group of CEBus devices that reside on a single physical medium.

In particular, the UHMN 720 "hails" for a house code (i.e., performs the protocol for acquiring a house code) for a BAN port 725 by first selecting a proposed house code address. The UHMN 720 first checks its other active BAN ports 725 to ensure this address is not already in use. If not, the UHMN 720 then polls the CEBus networks 773 linked to the respective BAN port 725 by way of a broadcast message to check if the first proposed house code address is already in use, e.g., by another, non-UHMN master node 770.

More particularly, the UHMN 720 broadcasts the proposed house code address in a "hailing LPDU" to all the CEBus networks 773 linked to the BAN port 725 via the respective BAN 740. Each NT 750 of each CEBus network 773 that receives the hailing LPDU forwards it to the respective CEBus nodes 754, 755 and 770 of its respective residence 751. In accordance with the CEBus standard, the UHMN 720 waits five seconds after transmitting the hailing LPDU to receive a hailing response LPDU from any other master node connected to the respective BAN port 725, indicating that the house system address chosen for the respective BAN port 725 is already in use.

If a hailing response LPDU is received by the UHMN 720 within five seconds after transmitting a respective hailing LPDU, then the UHMN 720 selects the next sequential house system address below the one used by the respective master node 770. The UHMN 720 repeats the above described procedure until it selects a house system address for its respective BAN port 725 that does not elicit a hailing response LPDU to its respective hailing LPDU within the specified time period. When this occurs, the UHMN 720 assumes the code to be available and assigns it to the respective BAN port 725.

In a presently preferred embodiment, an address of "EFFF" hex is used as a first selected house system address for the BAN port 725. This "upper end" hex address is preferred, since other, non-UHMN master nodes, (i.e., such as a master node 770 residing on a CEBus network 773), generally select respective house system addresses from a lower end, e.g., from a range of 0100 to 01FF hex. If the house system address EFFF hex is already in use, the UHMN 720 selects the next highest house system address (i.e., EEFF) and repeats the polling process to determine if it is also already in use. This process is continued until a selected house system address is determined to be available.

As will be appreciated by those skilled in the art, a new BAN port 725 house code assignment will normally be required only under certain circumstances. By way of example, an operator 745 may issue a command 760 to the UHMN 720 to hail for a house code for the BAN port 725 when the BAN port 725 is connected to an exemplary NT 750 for the first time, as part of the UHMN 720 installation. By way of a further example, the operator 745 may also issue the command 760 to the UHMN 720 when CEBus service is first activated on an NT 750 managed through the respective UHMN BAN port 725, or when an NT 750 has been out of service and has its service restored.

Figure 8:
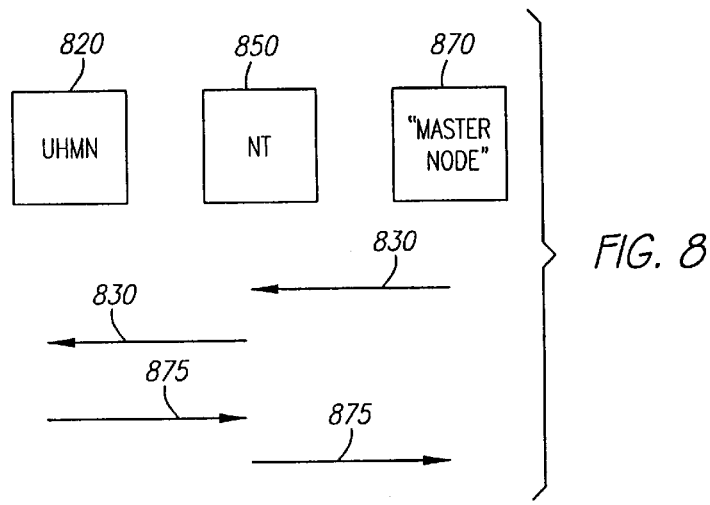
FIG. 8 is a diagram of a preferred non-UHMN master node protocol for obtaining a house code.

Referring to FIG. 8, in the upstream direction, a UHMN 820 may receive a hailing LPDU 830 transmitted from another master node 870 on a respective CEBus network. In particular, the master node 870 transmits the hailing LPDU 830 to the NT 850 of its respective residence (not shown). The NT 850 forwards the hailing LPDU 830 to the UHMN 820 linked to the master node's 870 respective CEBus network (also not shown) via a BAN (also not shown). The UHMN 820 must respond to the hailing LPDU 830 with a hailing response LPDU 875 if the house code the master node 870 is hailing for is in use by the UHMN 820. In particular, if there is a house code conflict, the UHMN 820 must respond with a timely hailing response LPDU 875 received by the master node 870 within one second of the master node 870 transmitting the hailing LPDU 830. The UHMN 820 transmits the hailing response LPDU 875, if required, to the NT 850 which transmitted the hailing LPDU 830. The NT 850 then forwards the hailing response LPDU 875 to the master node 870.

Notably, the respective NT 850 forwards both hailing LPDUs and hailing response LPDUs from other master nodes to its respective UHMN. Other LPDUs transmitted from other master nodes, e.g., an address assignment LPDU for a UMSN, however, are not forwarded by the receiving NT to its respective UHMN.

Figure 9:
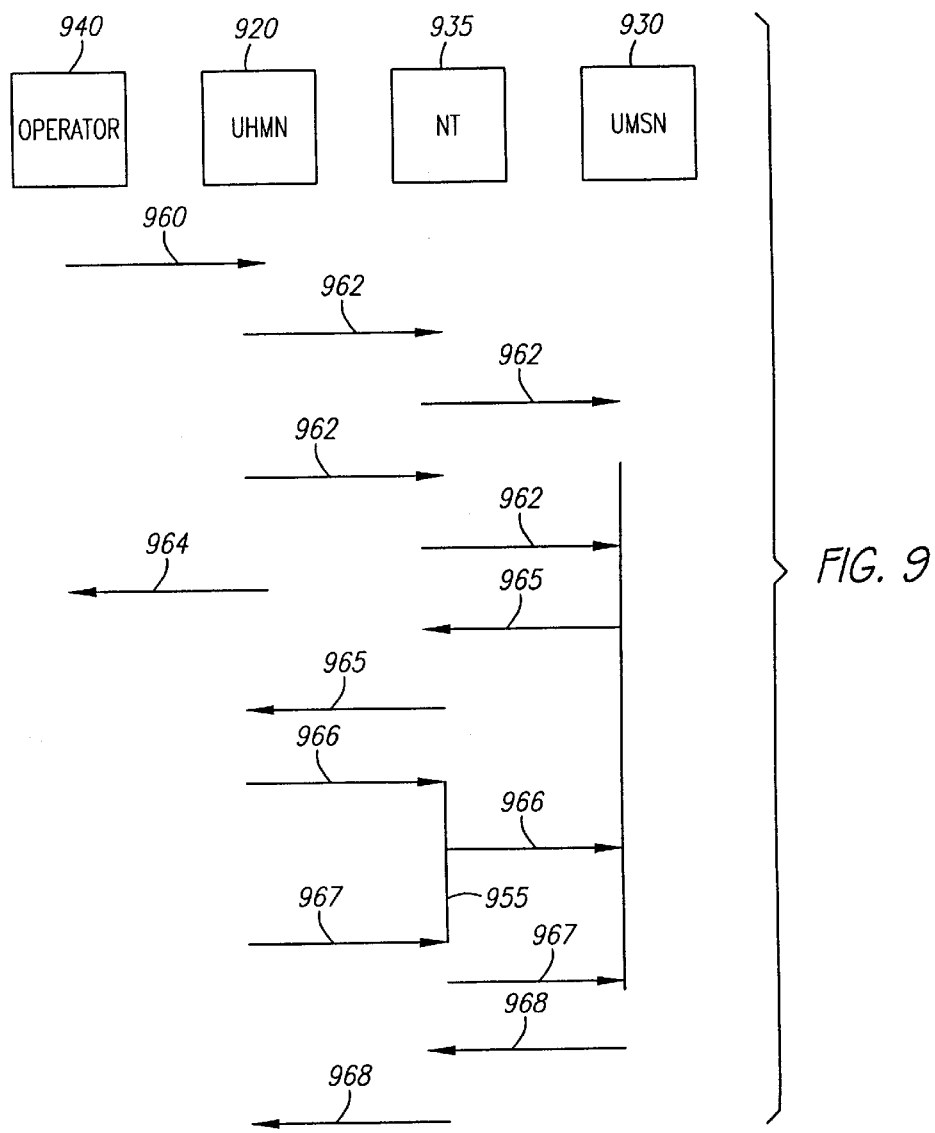
FIG. 9 is a diagram of a preferred message transmission protocol for a UHMN to assign a house code and unit address to a respective UMSN.

Referring to FIG. 9, an exemplary UHMN 920 assigns the house system address of its respective BAN port (not shown) and a unique, individual unit address to a UMSN 930 linked to the BAN port via its respective CEBus network (also not shown). The unique unit address assigned to the exemplary UMSN 930 is the lowest available, i.e., unused, unit address, with the possible valid unit address values consisting of 0001-00FD hex, 1001-7FFF hex, and 8001-EFFF hex. The UHMN 920 remains cognizant of the unit addresses which it has already assigned to CEBus nodes, including itself, and, thus, are unavailable. A UHMN operator 940 transmits a user command 960 to the UHMN 920, requesting that the respective house system address and unique unit address be transmitted to the UMSN 930.

In response to this user command 960, the UHMN 920 first attempts to acquire configuration master status by transmitting a broadcast LPDU 962 to hail for the right to be configuration master. In particular, the UHMN 920 transmits a broadcast LPDU 962 to all the NTs linked to the respective BAN. The broadcast LPDU has its destination house code field set to the EIA/IS-60 standard global value 0000 hex, its destination unit address field set to the EIA/IS-60 standard broadcast value 0000 hex, its source unit address field set to the UHMN's 920 unit address and its source house code field set to the house code for the UHMN's 920 respective BAN port. Exemplary NT 935 forwards the received broadcast LPDU 962 to all the UMSNs in its respective residence (not shown).

The UHMN 920 waits five seconds after transmitting the broadcast LPDU 962 to receive an LPDU from any other master node linked to the respective BAN indicating that the other master node is a configuration master. If the UHMN 920 receives an LPDU indicating another master node is configuration master, it transmits a message (not shown) informing its operator that it cannot acquire the configuration master privilege that the time. If, however, the UHMN 920 does not receive an LPDU indicating another master node is configuration master within five seconds of transmitting the broadcast LPDU 962, it re-transmits the broadcast LPDU 962 once again, for the sake of certainty.

An exemplary NT 935 receiving the retransmission of the broadcast LPDU 962, again forwards it to all the UMSNs in its respective residence. If the second re-transmission of the broadcast LPDU 962 also does not elicit a response indicating another master node is configuration master within five seconds of its transmission, then the UHMN 920 determines that it has successfully acquired the configuration master privilege for the following five minutes, and informs the operator 940 of this, via message 964.

The UHMN operator 940, on receiving message 964, contacts the UMSN installer (not shown) to ask the installer to activate the UMSN 930 for receiving its house code and unit address. A particular UMSN activation trigger is dependent on the design of the respective UMSN, but may be as simple as a push-button. If the particular UMSN that the UHMN 920 is attempting to assign a house code and unit address to is an NT, the UHMN operator 940 does not have to contact the NT installer to activate the NT.

For a non-NT UMSN 930, however, the UMSN installer, on being contacted by the UHMN operator 940, activates the UMSN 930, and the UMSN 930 assigns itself a temporary house code and a temporary unit address. In accordance with the CEBus standard, the UMSN 930 assigns itself a temporary house code of 8000 hex and, as it is very unlikely that any other CEBus device will be in the set-up phase at the same time, assigns itself a temporary unit address (as defined by its manufacturer). A UMSN hailing procedure for a temporary unit address is defined in section 6.2 of the EIA/IS-60.08.

Upon acquiring a temporary unit address, the UMSN 930 broadcasts a LPDU 965 indicating it is in an initial setup stage. In particular, the UMSN 930 transmits the broadcast LPDU 965 to its respective NT 935. In the broadcast LPDU 965, the destination house code field is set to the EIA/IS-60 standard global value 0000 hex, the destination unit address field is set to the EIA/IS-60 standard broadcast value 0000 hex, the source house code field is set to the UMSN's 930 temporary house code value 8000 hex, and the source unit address field is set to the UMSN's 930 temporary unit address acquired during the prior hailing procedure. Upon receiving the UMSN's 930 broadcast LPDU 965, the respective NT 935 transmits it to the UHMN 920. The UHMN 920, in response, transmits an LPDU 966 to the NT 935, which forwards it to the UMSN 930. The LPDU 966 instructs the UMSN 930 to increment a respective setup counter (not shown) for use in ensuring that only one master node at a time is trying to configure it.

The UHMN 920 then waits five seconds 955 after transmitting the LPDU 966, to ensure that there are no other master nodes also trying to configure the UMSN 930. If another master node is presently configuring the UMSN 930, it is assumed that it will be completed within five seconds. Thus, at the end of the five second wait period 955, the UHMN 920 transmits an LPDU 967 to the NT 935, to be forwarded to the UMSN 930. The LPDU 967 instructs the UMSN 930 to adopt the specified house code and unit address.

Upon receiving the LPDU 967, the UMSN 930 checks its setup counter and adopts the LPDU 967's specified house code and unit address if the setup counter indicates that only one master node, i.e., the UHMN 920, is attempting to configure it at the time. If the UMSN 930 is an NT, it will also store the UHMN's unit address indicated in the LPDU 967. In particular, the NT loads the respective UHMN's 920 unit address into a non-volatile memory, such as a CEThinx chip, and then uses this address to filter subsequent messages sent to the UHMN 920 from downstream UMSNs linked to the NT's respective CEBus network.

If, on checking its setup counter, the UMSN 930 finds that more than one master node is attempting to configure it, it does not adopt the specified house code and unit address of LPDU 967. The UMSN 930 transmits a LPDU 968 indicating a success, if it adopts the respective house code and unit address, or a failure, if its setup counter indicates another master node is attempting to configure it, to its respective NT 935, which forwards it to the UHMN 920.

In addition to individual MAC, or unit, addresses, a CEBus node can be assigned one or more group MAC addresses. A group MAC address allows the collective addressing of some, but not all, CEBus nodes with a particular house code. For example, the lights and heater of an outdoor swimming pool of a residential home can be assigned a group MAC address, which would then allow the respective UHMN linked to them to control their collective power on or off with one "direct load control" LPDU. Thus, following the EIA/IS-60 specified protocol, a UHMN can also implement the assignment of a group MAC address to a group of UMSNs.

Once a UHMN has completed the above-referenced address assignments, it can effectively communicate with any UMSN, including any NT, that it has network link access to. Thus, a UHMN may transmit an LPDU containing a CAL message for an automatic meter read of a respective CEBus node. Exemplary electric meters which can be UHMN-accessed for automatic meter reads include Intellon and Diablo manufactured meters. A UHMN may also transmit an LPDU containing a CAL message for a direct load control of a respective CEBus node.

In a presently preferred embodiment, a UHMN which transmits an LPDU containing a CAL automatic meter read message or a CAL direct load control message to a UMSN looks to receive a response from the respective UMSN within one second of the transmission of the respective LPDU. An exemplary preferred communication protocol for UHMN/UMSN communication is shown and described in the above-incorporated U.S. patent application Ser. No. 08/843,461.

Figure 10:
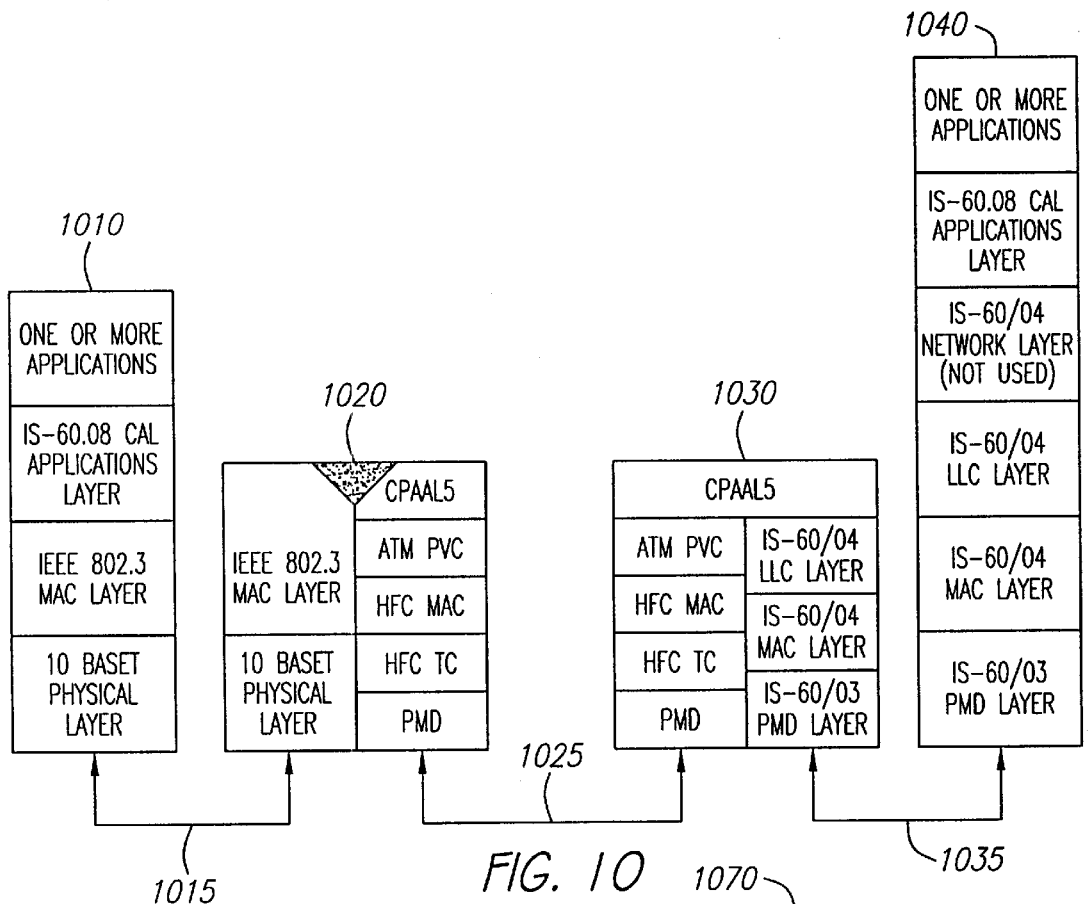
FIG. 10 is a diagram of a preferred end-to-end protocol stack for CEBus LPDU transmission between a UHMN and a UMSN over an ethernet interface.

Referring to FIG. 10, a presently preferred end-to-end protocol stack implementation for the transfer of CAL messages between a UHMN and a UMSN, with an NT serving as an intermediate protocol convertor and the UHMN having an ethernet interface, includes a UHMN protocol stack 1010, an ANT protocol stack 1020, an NT protocol stack 1030 and an UMSN protocol stack 1040. More particularly, an ANT is linked to the UHMN via ethernet 1015, for example, and IEEE 802.3 LAN, and is linked to the NT via a BAN 1025. The NT is linked to the UMSN via a CEBus network interface 1035.

Figure 11:
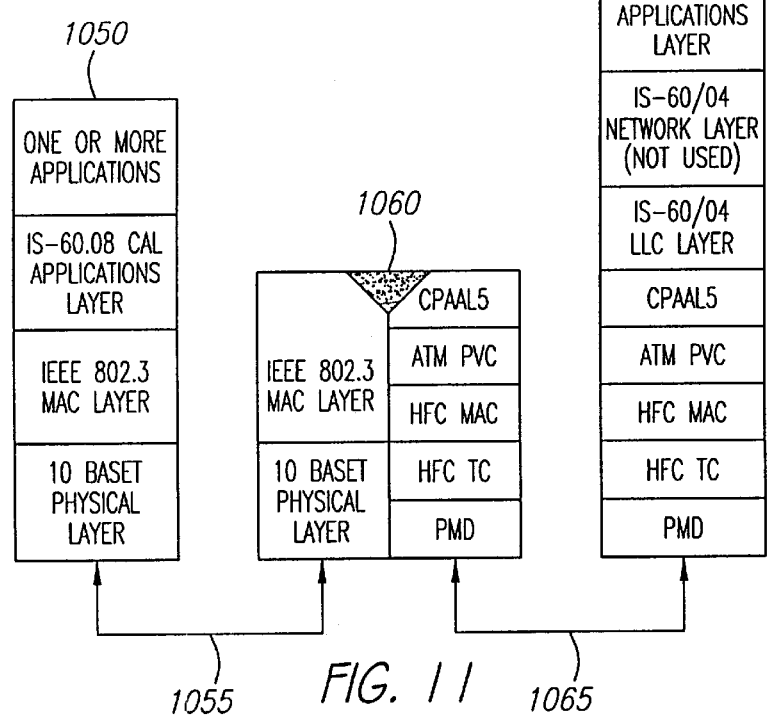
FIG. 11 is a diagram of a preferred end-to-end protocol stack for CEBus LPDU transmission between a UHMN and an NT over an ethernet interface.

Referring to FIG. 11, a presently preferred end-to-end protocol stack implementation for the transfer of CAL messages between a UHMN and an NT acting as a UMSN, with the UHMN having an ethernet interface, includes a UHMN protocol stack 1050, an ANT protocol stack 1060 and an NT protocol stack 1070. An ANT is linked to the UHMN via ethernet 1055, for example, an IEEE 802.3 LAN, and is linked to the NT via a BAN 1065.

Figure 12:
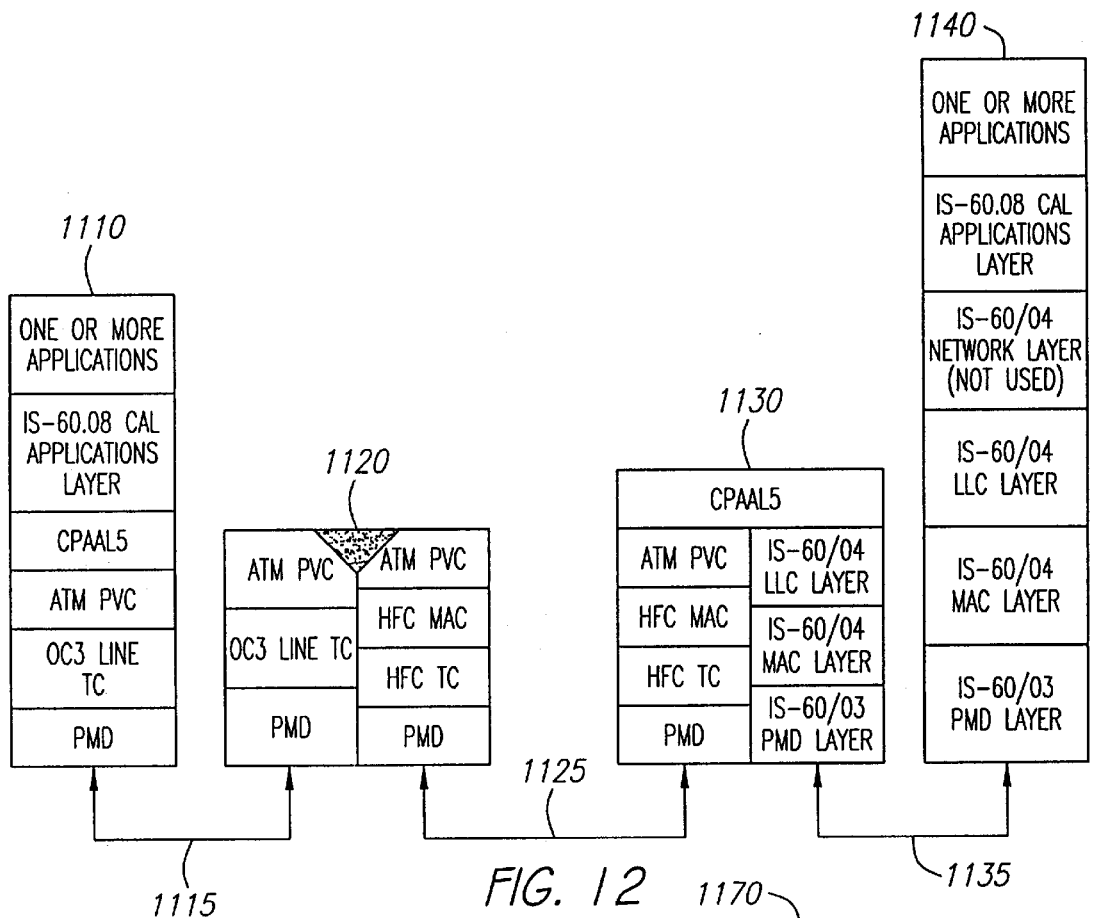
FIG. 12 is a diagram of a preferred end-to-end protocol stack for CEBus LPDU transmission between a UHMN and a UMSN over an ATM-based interface.

Referring to FIG. 12, a presently preferred end-to-end protocol stack implementation for the transfer of CAL messages between a UHMN and a UMSN, with an NT serving as an intermediate protocol convertor and the UHMN having an ATM interface, includes a UHMN protocol stack 1110, an ANT protocol stack 1120, an NT protocol stack 1130 and a UMSN protocol stack 1140. An ANT is linked to the UHMN via an ATM interface 1115 and is linked to the NT via a BAN 1125. The NT is linked to the UMSN via a CEBus network interface 1135.

Figure 13:
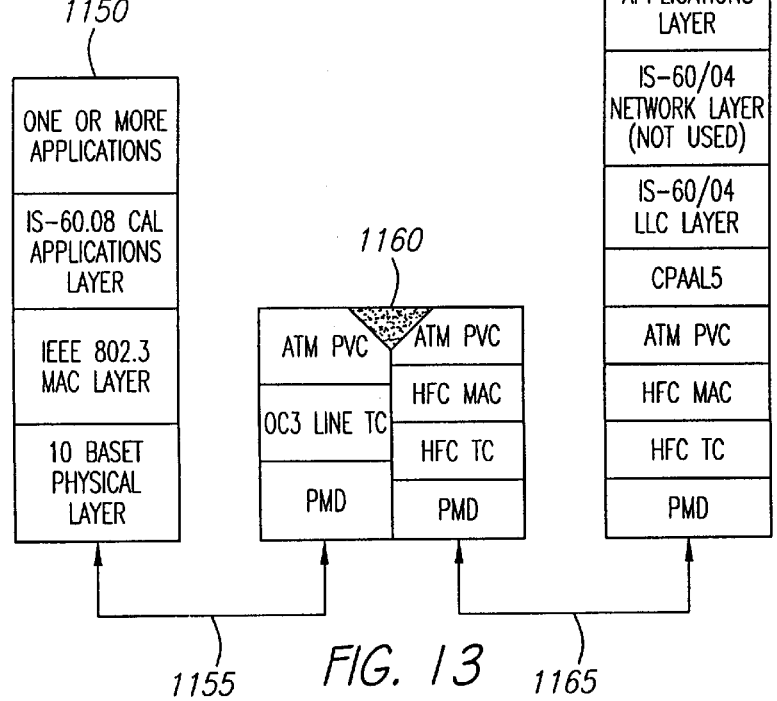
FIG. 13 is a diagram of a preferred end-to-end protocol stack for CEBus LPDU transmission between a UHMN and an NT over an ATM-based interface.

Referring to FIG. 13, a presently preferred end-to-end protocol stack implementation for the transfer of CAL messages between a UHMN and an NT acting as a UMSN, with the UHMN having an ATM interface, includes a UHMN protocol stack 1150, an ANT protocol stack 1160 and an NT protocol stack 1170. An ANT is linked to the UHMN via an ATM interface 1155, and is linked to the NT via a BAN 1165.

While embodiments and applications of preferred apparatus and methods for a remotely located master node, e.g., a utility server controller, to access and control electronic devices connected to multiple CEBus networks via a non-CEBus network have been shown and described, as would be apparent to those skilled in the art, many modifications and applications are possible without departing from the inventive concepts herein.

Thus, the scope of the disclosed inventions is not to be restricted except in the spirit of the appended claims.

What is claimed:

1. A system for providing remote control of CEBus devices located on a plurality of CEBus networks, comprising:

a master node having a first interface port configured for transmitting and receiving messages to and from a first plurality of CEBus devices located on a first selected CEBus network over non-CEBus access network, and a second interface port configured for transmitting and receiving messages to and from a second plurality of CEBus devices located on a second selected CEBus network over the non-CEBus access network; and a plurality of network terminals, at least one network terminal located on each of the first and second selected CEBus networks, wherein each network terminal is configured for transmitting and receiving messages over the respective CEBus network on which it is located, and wherein each network terminal is further configured for transmitting and receiving messages to and from the master node over the non-CEBus access network.

2. The system of claim 1, wherein the first interface port of the master node and the respective first plurality of CEBus devices and the one or more network terminals located on the first selected CEBus network are all assigned to a first common CEBus house code.

3. The system of claim 2, wherein the second interface port of the master node and the respective second plurality of CEBus devices and the one or more network terminals located on the second selected CEBus network are all assigned to a second common CEBus house code.

4. An energy management system for providing remote control of first and second utility managed settable nodes ("UMSNs") located on respective first and second CEBus networks, comprising:

a utility host master node ("UHMN") configured for communication over a non-CEBus access network;

a first network terminal ("NT") located on the first CEBus network, the first NT configured for transmitting and receiving messages to and from the first UMSN over the first CEBus network, and for transmitting and receiving messages to and from the UHMN over the access network; and a second NT located on the second CEBus network, the second NT configured for transmitting and receiving messages to and from the second UMSN over the second CEBus network, and for transmitting and receiving messages to and from the UHMN over the access network.

5. The system of claim 4, wherein the access network is an ATM-based broadband access network.

6. The system of claim 4, wherein the access network further comprises an energy management terminal ("EMT") configured to transmit and receive internet protocol messages to and from the UHMN, and to transmit and receive ATM messages to and from the respective first and second NTs over the access network.

7. A method for transmitting messages from a master node located on a non-CEBus access network to first and second CEBus devices located on respective first and second CEBus networks via respective first and second network terminals, the first network terminal located on both the access network and the first CEBus network, the second network terminal located on both the access network and the second CEBus network, the method comprising the steps of:

selecting a first CEBus house code for a first access network interface port of the master node;

selecting a second CEBus house code for a second access network interface port of the master node;

assigning the first selected CEBus house code to the first selected network interface port, the first network terminal and the first CEBus device; and assigning the second selected CEBus house code to the second selected network interface port, the second network terminal and the second CEBus device.

8. The method of claim 7, wherein the respective steps of selecting and assigning the respective first and second house codes are performed by the master node.

9. The method of claim 7, wherein the step of selecting a CEBus house code for the first interface port of the master node comprises the steps of:

broadcasting a first proposed house code from the master node over the access network; and assigning the first proposed house code to the first interface port of the master node if no responsive message to the broadcast is received by the master node within a selected time period.

10. The method of claim 9, wherein the step of selecting a CEBus house code for the first interface port of the master node further comprises the steps of:

broadcasting a second proposed house code from the master node over the access network if a responsive message to the first proposed house code broadcast is received within the selected time period; and assigning the second proposed house code to the first interface port of the master node if no responsive message to the second broadcast is received by the master node within the selected time period.

* * * * *